(12) United States Patent
Merino Gonzalez et al.

(10) Patent No.: US 9,369,575 B2
(45) Date of Patent: Jun. 14, 2016

(54) DYNAMIC VOIP LOCATION SYSTEM

(75) Inventors: Jose Luis Merino Gonzalez, Kortessem (BE); Jonathan Myers, Wokingham (GB)

(73) Assignee: SHOO 533 LIMITED, Wokingham (GB)

( * ) Notice: Subject to any disclaimer, the term of this patent is extended or adjusted under 35 U.S.C. 154(b) by 104 days.

(21) Appl. No.: 14/110,015

(22) PCT Filed: Apr. 4, 2012

(86) PCT No.: PCT/GB2012/050756
§ 371 (c)(1),
(2), (4) Date: Feb. 17, 2014

(87) PCT Pub. No.: WO2012/136996
PCT Pub. Date: Oct. 11, 2012

(65) Prior Publication Data
US 2014/0146713 A1    May 29, 2014

(30) Foreign Application Priority Data

Apr. 4, 2011   (GB) .................................... 1105682.7

(51) Int. Cl.
*H04M 3/42* (2006.01)
*H04L 29/12* (2006.01)
*H04W 4/02* (2009.01)

(52) U.S. Cl.
CPC ..... *H04M 3/42348* (2013.01); *H04L 29/12094* (2013.01); *H04L 61/1529* (2013.01); *H04W 4/02* (2013.01)

(58) Field of Classification Search
CPC ............... H04L 41/12; H04L 41/0213; H04M 2242/30; H04M 7/006; H04M 2242/04; H04M 7/0069; H04W 76/007; H04W 64/003; H04W 64/00; H04W 88/16; H04W 4/22
See application file for complete search history.

(56) References Cited

U.S. PATENT DOCUMENTS

| | | | |
|---|---|---|---|
| 2004/0203894 A1 | 10/2004 | Watanabe et al. | |
| 2005/0213716 A1* | 9/2005 | Zhu et al. ......................... | 379/45 |
| 2006/0116127 A1* | 6/2006 | Wilhoite et al. ............... | 455/442 |
| 2007/0173223 A1* | 7/2007 | Mehio et al. ................ | 455/404.1 |
| 2007/0242660 A1* | 10/2007 | Xu ................................. | 370/352 |
| 2008/0160953 A1* | 7/2008 | Mia et al. ................... | 455/404.2 |
| 2009/0201916 A1* | 8/2009 | Caron et al. .................. | 370/352 |
| 2010/0034122 A1* | 2/2010 | Croy et al. .................... | 370/260 |
| 2012/0270567 A1* | 10/2012 | Johnson ..................... | 455/456.3 |

OTHER PUBLICATIONS

International Search Report, dated Sep. 19, 2012, issued in priority International Application No. PCT/GB2012/050756.
Romijn et al., "Mobility management for sip sessions in a heterogenous network environment," Bell Labs Technical Journal, Wile, CA, vol. 9, No. 3, pp. 237-253 (Nov. 1, 2004) XP001506927.

(Continued)

*Primary Examiner* — Jung-Jen Liu
(74) *Attorney, Agent, or Firm* — Saul Ewing LLP

(57) ABSTRACT

A system for determining dynamically any given registered wireless device VoIP location, whereby the dynamic method reports the VoIP address return path as being the VoIP Location into a database. Applications of the system can access the database to contact each individual, specific, fixed or wireless device by VoIP for any data exchange.

19 Claims, 4 Drawing Sheets

(56) References Cited

OTHER PUBLICATIONS

Vakil et al., "Mobility management in a sip environment requirements, functions and issues; draft-itsumo-sip-mobility-req-02.txt," 20001201, No. 2 (Dec. 1, 2000) XP015030346.

Rosenberg et al., "SIP: session initiation protocol," 20020601; 20020600, pp. 1-269 (Jun. 1, 2002) XP015009039.

\* cited by examiner

DYNAMIC VOIP LOCATION SYSTEM

CROSS REFERENCE TO RELATED APPLICATIONS

This application claims the priority of PCT/GB2012/050756, filed on Apr. 4, 2012, which claims priority to Great Britain Application No. 1105682.7, filed Apr. 4, 2011, the entire contents of each of which are hereby incorporated fully by reference.

BACKGROUND

1. Field of the Invention

The present invention is directed to service providers, telephony companies, messaging service companies, notification service companies or services, database management companies, all for private or public use. Specifically, the Dynamic VoIP (Voice over internet protocol) location system is designed to provide VoIP location information to a server or multiple servers in order to enable (a) reliable data exchange from such server or servers to any device connected to the internet and/or (b) communication between any different devices connected to the internet to at least one of the system servers, provided that any such devices are subscribed to the Dynamic VoIP location system server service.

2. Background of the Invention

Current systems and methods for identifying the VoIP location of a device user (be it a fixed or wireless device) connected to the internet to which to send data to is commonly done by means of the device user, at the time it requires certain data, to then access a so called URI (uniform resource identifier) consisting of a URL (uniform resource locator) and a URN (uniform resource name) and receive a reply to its "return path" with the data it required. This 'return path' is what we refer to in this invention as the user's device VoIP location.

This commonly used way of receiving data on demand when the user requires it and extracts it itself through the internet (VoIP) is cumbersome and inflexible as it does not allow receipt of the latest, most up-to-date data or information as and when it becomes available as the user may simply not know that data he requires is available to him.

More recently systems known as "Push Notification System" have addressed this as a potential solution, however they do not resolve the reliability aspects in terms of ensuring the return path (i.e. the user's device VoIP location) is accurate at all times.

In particular when devices connected to the internet, even if subscribed to an existing "Push Notification System", have the following properties:

a.—for example in the case of a fixed device, it may reconnect to different VoIP (internet) access points available to it (for example, it may disconnect from one WiFi router to connect to another different WiFi router)

b.—for example, in the case of a wireless device such as a mobile phone, it may be on the move and thus change in the mobile network's "Location Area" (LC). However, even within the same "Location Area" mobile networks may have a segmentation of several different cells. The wireless device VoIP "Routing Area" (RA) may therefore be different depending on which cell it's connected to within a certain "Location Area" (LA). This complexity in mobile networks, where mobile devices interact with the mobile network, depending on which state the mobile device is in, ensures the mobile network at all times updates the "Routing Area" of each mobile device connected to it. For example when the mobile device changes cell, the mobile network updates the mobile device "Routing Area". When it changes "Location Area", the mobile device establishes a new connection and the mobile network records the new location or "Routing Area" of such a mobile device.

Even the most recent systems, such as those known as "Push Notification" systems, do not have access to mobile operator's mobile devices VoIP "Routing Area", which would provide the reliable information needed to extract the return path or "VoIP location" described herein. This remains a major technical issue still not resolved by the prior art systems. A key aspect inherent to the complexity of VoIP networks all interconnected to each other, is that firewalls further complicate and reduce the reliability of most solutions. Another aspect that is not resolved in both fixed and wireless devices, and is most critical in wireless devices, is the power consumption used when having to access very often specific URLs to see if any more updated or required information is available to the fixed or wireless device users, only to find out (more often than not) that the access, with the corresponding data use and power consumption, was unnecessary.

Attempts have been made by companies providing automatic Push Notifications to use databases for those devices subscribed to their system. This in itself does not provide a solution to the issues described before; in particular they do not resolve the near real time "WiFi router" or mobile network "Routing Area" changes (return path—VoIP location) nor the minimizing of power consumption.

SUMMARY OF THE INVENTION

The present invention is designed to overcome the shortcomings of the prior art and to provide an automated way of identifying and reporting those VoIP return paths or "VoIP location" addresses to a database for subsequent use by all kinds of different applications, with access to such database (s) for all those device users connected to the internet (VoIP) and subscribed to the Dynamic VoIP location system described herein. Moreover the present invention addresses in particular the need for power consumption reduction, in particular for wireless devices using this invention, whilst maintaining the reliability of the near real-time updating of the VoIP return paths or "VoIP location" addresses of each mobile device user connected to the internet (VoIP) and subscribed to this Dynamic VoIP location system described herein.

The present invention is preferably a service offered by VoIP service providers, VoIP telephony companies, VoIP messaging service companies, VoIP notification service companies, VoIP database management companies or VoIP Data Content Providers.

As a matter of illustration of the present invention, consider the use by a VoIP service provider with registered users using mobile phones, who in the prior art would have an application of a VoIP service provider running permanently on these mobile phones, each connecting to a SIP server at an interval of several seconds. This previous system or method, whilst ensuring the return path is known to the SIP server, which can then send incoming calls signalling as and when they happen, becomes unpractical in its daily use at it drains the battery of the mobile device.

Other systems known in the prior art make use of so called Push Notification systems, whereby the mobile device application is also subscribed to the push notification system of a $3^{rd}$ party, different then the VoIP service provider. In this latter system, the mobile phone has the VoIP service provider application switched off, waiting for the push notification system to notify the mobile device with an incoming request, be it an incoming message or an incoming call. This previous system or method, whilst ensuring the battery use of the mobile device is minimal, does not ensure a reliable return path. That is because the mobile device may have changed WiFi router or mobile network VoIP "Routing Area". On many occasions, it would not receive the push notification when on the move, and as such this approach becomes impractical for daily use for mobile devices.

The present invention resolves both key technical aspects of the prior art, namely a reliable return path (i.e. VoIP location) whilst ensuring minimal required power consumption. This is achieved by doing things differently from the prior art. Namely, this invention does not rely on the mobile network VoIP "Routing Area" as it does not have access to it. Instead however, it relies on the mobile device downloadable software module, which at any change of VoIP access method or name, authenticates and connects to the Dynamic VoIP location system to which the mobile device is subscribed to and described herein. The combination of this software module (downloadable to each mobile device) together with the dynamic return path (VoIP location) extraction at the server of each mobile device connected to the server to which it's subscribed to, jointly form the Dynamic VoIP location system. As the mobile software module additionally checks if any other application is running on the mobile device other then itself, including in standby mode, it will close all other applications (such as for example the application of the previous mentioned SIP service provider) AND will switch the VoIP access method of the mobile phone to the smallest bandwidth available to such mobile phone, for example switching from 3G/UMTS/WCDMA to GPRS.

This last action by the software module, reduces the power consumption of the mobile phone to the lowest possible, whilst still ensuring VoIP connection by the mobile phone. The mobile network's "Routing Area" still ensures including border areas in coverage, due to the fact that small bandwidth (i.e. GPRS) is more reliable then high bandwidth (i.e. 3G). This ensures the highest possible reliability also for the Dynamic VoIP location system of this invention.

As stated before, the software module (as a part of the Dynamic VoIP location system) is downloadable by a mobile device which will then connect and authenticate to the server of the Dynamic VoIP location system at certain time intervals, but in particular at each change of wireless connection method or name. For example, any time the software module detects a change from 3G to GPRS or from GPRS to WiFi or from WiFi router name c to another WiFi router name or from no wireless to a wireless connection no GPRS to GPRS or from WiFi loss to GPRS, then the software module will connect at that specific time and authenticate to the server. When no change is detected for a certain time period then at regular longer time intervals to safe power consumption the software module will optionally also connect to the server to ensure that when a mobile changes cell in a mobile network that this results in a connection from the software module to the server. In this way the server will be able to keep the VoIP return path or "VoIP Location" of each mobile device registered to the Dynamic VoIP location system up to date.

An object of the present invention is to reduce the time and effort, but more importantly the probability of error, to synchronize a database from a private individual or business with the database of $3^{rd}$ party, performed in a fully automated and dynamic manner by the $3^{rd}$ party, with express consent of such private individual or business.

Another object of the present invention is to provide a system that maintains the "VoIP location" or return path of each registered VoIP device user updated in a database (for use by applications to communicate with each such user at a future time, as described herein) by reducing the power consumption of such registered VoIP user devices to a minimum.

Re-capping, the invention in a first aspect is a system for detecting or determining any given "VoIP location" of any "VoIP enabled device registered to the system" by extracting any such device's "VoIP address or return path" and storing it and updating it in one or more accessible databases, in which: (a) the system is adapted to receive VoIP communications from multiple VoIP enabled devices; (b) the system enables access to information in one or more databases; (c) the system is capable of extracting and reporting dynamically the "VoIP address or return path" and all associated information from each incoming data communication from any "VoIP enabled device registered to the system" into a database(s) associated with each corresponding registered VoIP enabled device user account; (d) the system is capable of extracting a specific "VoIP address or return path" and all associated information corresponding to a specific registered VoIP enabled device user account from the system accessible database(s) and communicating with each specific VoIP enabled device registered to the system through each specific "VoIP address or return path".

Optional features include the following:
the "VoIP enabled device registered to the system" incorporates a "software module", downloadable to the VoIP enabled device, which at certain time intervals authenticates and connects to a server which is part of the system.
the server then authenticates if it's a registered VoIP device user and extracts the "VoIP address or return path" and stores this data into the registered VoIP enable device user account as the "VoIP location" and the server can at any time send data to any specific registered VoIP device user.
such time intervals correspond to the times of detection of any change of VoIP access method or name by the "VoIP enabled device registered to the system".
the transition from the "VoIP enabled device registered to the system" changes from not synchronised to synchronised is also considered a change of VoIP access method or name.
the time between each time interval of the registered VoIP enabled device authenticating and/or connecting with the server is less than the time allowed by the registered VoIP enabled device to receive a response from the server.
any "VoIP enabled device registered to the system" (VoIP device 1) can connect to any such other different "VoIP enabled device registered to the system" (VoIP device 2), the system comprising: (a) "VoIP device 1" authenticating and connecting to the system server and providing in its payload data destined for "VoIP device 2"; (b) the server extracting from the data communication with "VoIP device 1" the payload data destined for "VoIP device 2"; (c) the server extracting from its accessible database the "VoIP location" or "VoIP address or return path" of "VoIP device 2" and communicating with "VoIP device 2" by sending it the data and the origin of such data as having been originated from "VoIP device 1".
any "VoIP enabled device registered to the system" (VoIP device 3) can send commands to any such other different "VoIP enabled device registered to the system" (VoIP device 4) the system comprising: (a) "VoIP device 3" authenticating and connecting to the system server and providing in its payload a command known by and destined for "VoIP device 4"; (b) the server extracting from the data communication with "VoIP device 3" the payload command data destined for "VoIP device 4"; (c) the server extracting from its accessible database the "VoIP location" or "VoIP address or return path" of "VoIP device 4" and communicate with "VoIP device 4" by sending it the command data; (d) optionally the server sending to its destination "VoIP device 4" together with the command data also the origin of such data as having been originated from "VoIP device 3".

the system server can send payload data and/or payload commands to any individual or such multiple "VoIP enabled device(s) registered to the system" the system comprising: (a) the system server extracting from its accessible database(s) the "VoIP location" or "VoIP address or return path" of any individual or such multiple "VoIP enabled device(s) registered to the system" it wishes to communicate with; (b) the server extracting from its accessible database(s) any such payload data and/or payload commands; (s) the server send the payload data and/or payload commands from previous point 'b' to all the "VoIP address or return paths" of previous point 'a' corresponding to each unique "VoIP enabled device(s) registered to the system".

the system server stores the "software module" which can be downloaded by any "VoIP enabled device".

a "VoIP enabled device" registered to the system is a wireless enabled VoIP device; for example but not limited to a mobile phone, mobile smart phone, wireless pc card, wireless module, wireless tablet, wireless pc.

a wireless "VoIP enabled device" can download over the air the "software module".

the software module is also capable of; (a) detecting if any other software applications other then this invention's previous mentioned "software module" is active and (b) if the wireless "VoIP enabled device" is in the standby mode, then (c) if previous 'a' and 'b' are not detected then the "software module" will disable the highest bandwidth VoIP communication and enable only the lowest bandwidth VoIP communication method available to the wireless "VoIP enabled device", and (d) if the "software module" detects any of previous 'a' or 'b' then it will deactivate previous point 'c', meaning it will activate or enable the highest bandwidth VoIP communication available to the wireless "VoIP enabled device".

a wireless "VoIP enabled device" registered to the system in particular includes such "certain time intervals" being performed at the times of detection of any change of mobile network cell, wherein the transition from the wireless "VoIP enabled device registered to the system" changing from not synchronised to synchronised to a mobile network cell is also considered a change of VoIP access method or name.

a "VoIP enabled device" registered to the system is a wired line VoIP enabled device; for example but not limited to a tablet, pc, desktop computer, server.

"VoIP" may use any such data communications protocol; for example but not limited to: GSM/GPRS, WAP, 3G, UMTS, 4G, WiFi, Wimax, CDMA, WCDMA, WSCDMA, SCDMA, TDSCDMA, CWTS, CWPAN, PDS, PHS, Bluetooth, WRP, WNP, WAN, LAN, ATM, ISDN, DSL, ADSL, VDSL, ISDM, HTML, TCP/IP, HTTP, HTTPS, UDP.

A second aspect is method for detecting or determining any given "VoIP location" of any "VoIP enabled device registered to the system" by extracting any such device's "VoIP address or return path" and storing it and updating it in one or more accessible databases, in which the method is performed by a system as defined above.

Additional features and advantages of the invention will be set forth in the description which follows, and in part will be apparent from the description, or may be learned by practicing the invention. The objectives and other advantages of the invention will be realized and attained by the structure particularly pointed out in the written description and claims as well as the drawings hereto.

DETAILED DESCRIPTION OF THE INVENTION

Figure 1:
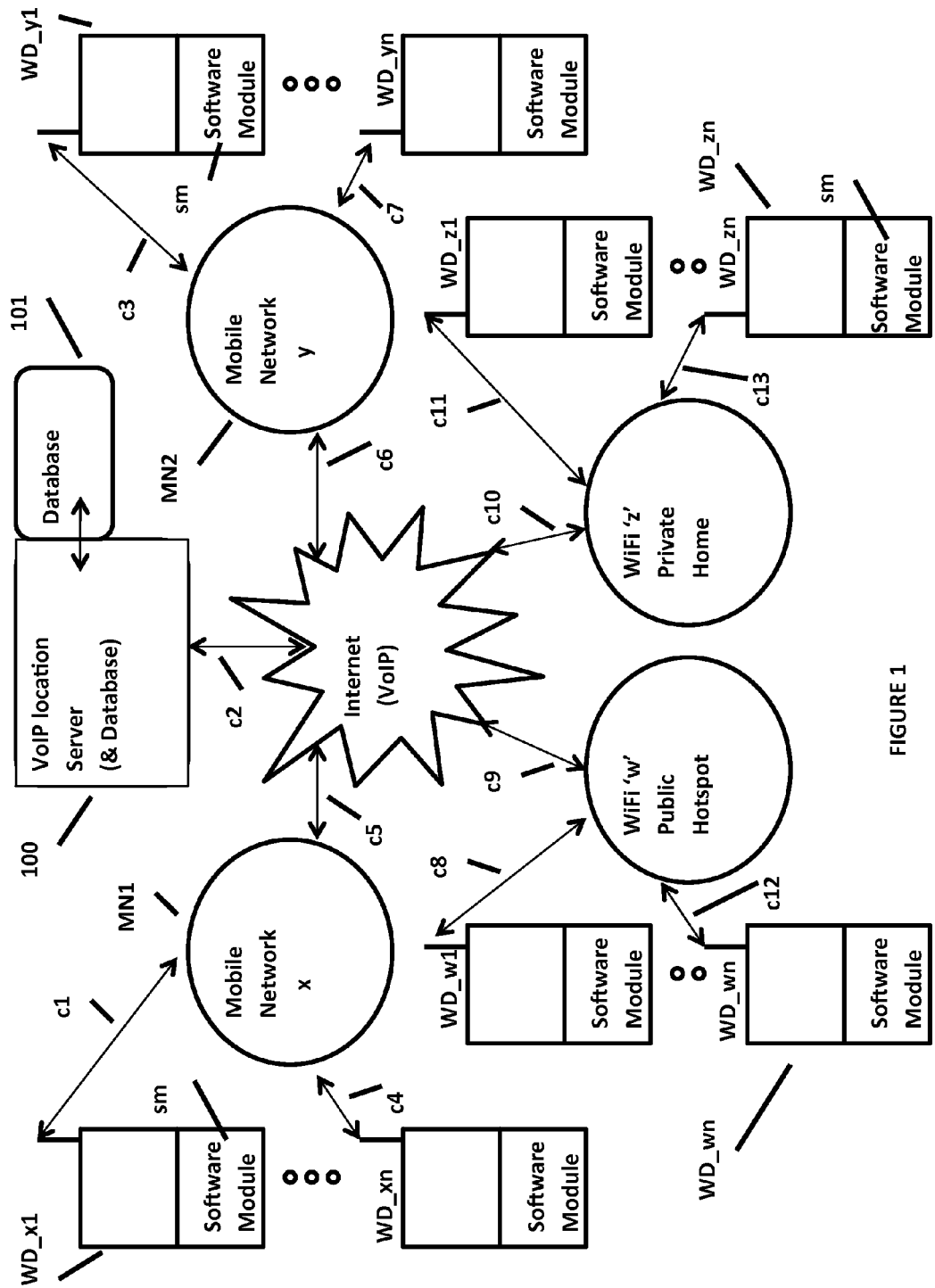
FIG. 1 is a schematic diagram of a preferred embodiment of the present invention.
Figure 2:
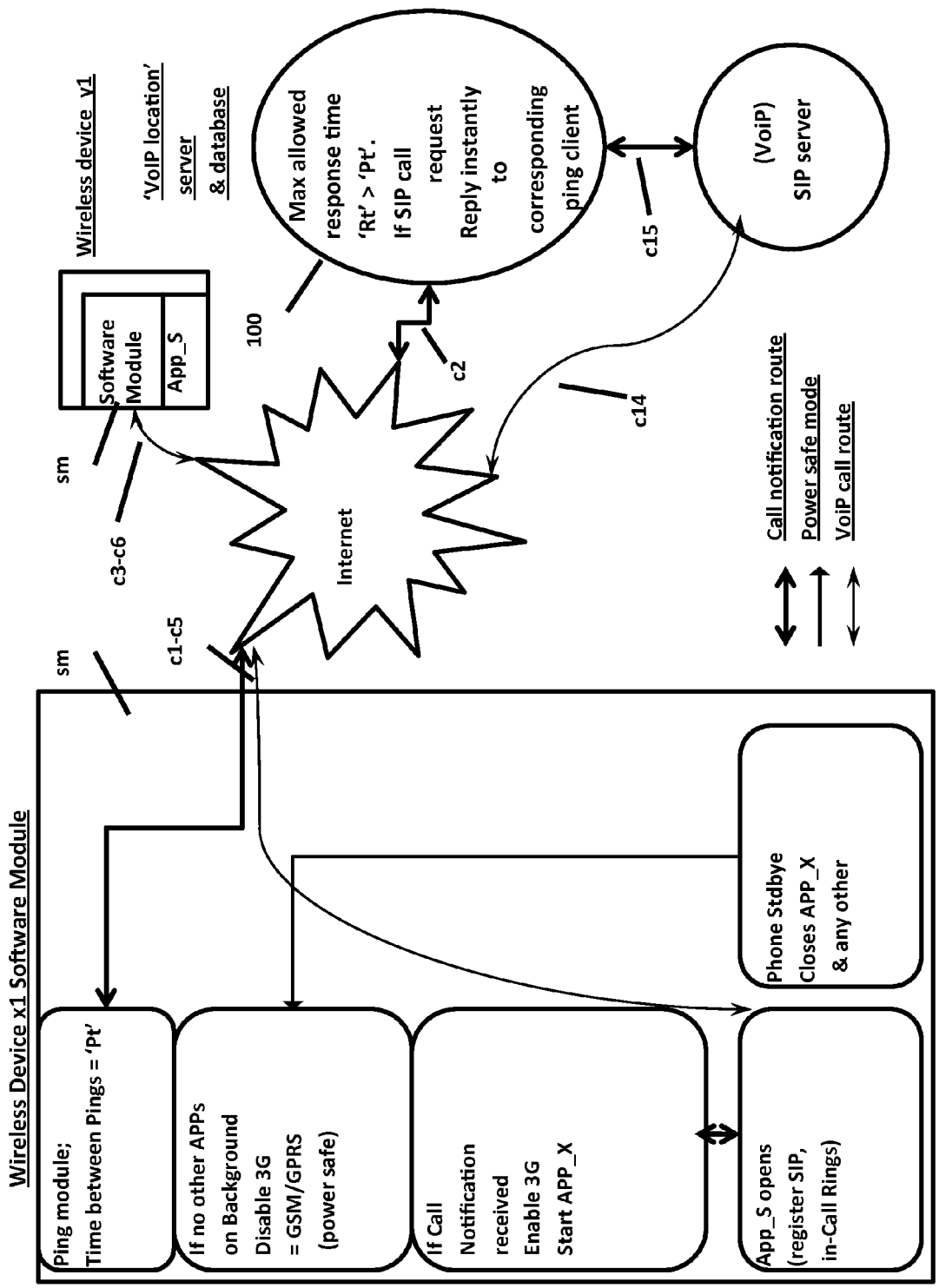
FIG. 2 is a flow diagram of a preferred embodiment of the present invention.

Referring to FIGS. 1 and 2, a Dynamic VoIP location system which could be a private or commercial server 100 (VoIP location server), in any location in the world which uses internet services, and which includes one or more databases (VoIP location database) and an external internet access c2 to the system 100. Additional external access means to the system can also be present. Additional external databases 101 (VoIP location database) may be accessible to the system 100. The system server 100, could host the 'software module' (VoIP location software module 'sm') downloadable into a wireless device; for example the 'software module' as shown in FIGS. 1 and 2 in each wireless device WD_x1 and WD_y1 and WD_wn and WD_zn and so forth in FIG. 1.

To use the "Dynamic VoIP location system" service, the device users must connect to the VoIP location server and subscribe to the service. In some very specific cases, where the information of a specific database accessible to the system consists explicitly and only of public information without any legal restriction on disclosure of any form from any third party whatsoever, only in this last case potentially no subscription would be required if so decided by such $3^{rd}$ party.

The Dynamic VoIP location system consisting of at least one VoIP location server '100' and at least two or more devices that incorporate a 'sm'(VoIP location software module). The VoIP location server preferably keeps a record of the subscribers (with their express consent) in a database 101, preferably resident within the same server 100 and stores their user identification and originating VoIP address or VoIP return path (referred to herein as the user's "VoIP location") to reply to.

In the example shown in FIG. 1, it is assumed that wireless devices are subscribed the Dynamic VoIP location system (100) and have a VoIP location software module (sm) embedded in each user's wireless device. All wireless devices with a built in 'sm' authenticate and communicate with server 100 even when the wireless device is in standby mode. The 'sm' communicates with server 100 after wireless device power-up and each time the wireless device changes VoIP access name (for example when changing between any of the following 3G, GPRS, WiFi or between any of the previous and a new different to the previous WiFi router name and when changing between mobile cells. The 'sm' will force the wireless device to close any such other applications different from the 'sm' itself that requires VoIP connection and additionally will force the wireless device to switch to the lowest available bandwidth VoIP access means, for example switch from 3G/WCDMA to GPRS, as shown in FIG. 2.

The VoIP location server 100 will, each time a wireless device (WD_X1, WD_zn, etc.) with a built in VoIP location software module 'sm' subscribed to the Dynamic VoIP location system connects with the server, store the return response path referred to in this invention as each wireless device user's VoIP Location and which for example will correspond in the event of a wireless device connect through GPRS with its unique PSPDN (packet switched public data network) address at such time.

As a matter of illustration of the workings of the Dynamic VoIP location system, wherein 3G enabled wireless device WD_y1 wishes to call 3G enabled wireless device WD_x1, where both devices incorporate a SIP software application that enables VoIP conversations and incorporate also this invention's VoIP location software module 'sm'. Both WD_x1 and WD_y1 latest VoIP location (VoIP return path or also known in the industry as PSPDN (packet switched public data network) address is stored in VoIP Location server 100 or in external database 101 accessible to the server 100 and updated by the wireless devices as described herein before. The 'sm' in both wireless devices have switched the wireless devices to the least power consuming GPRS instead of the higher power consuming 3G.

As illustrated in FIG. 2 Wireless device user WD_y1 starts opening its SIP application (wireless device exits standby state), whereby 'sm' switches WD_y1 from GPRS to 3G (highest available VoIP bandwidth) and the user initiates a SIP to WD_x1 who is in standby mode through VoIP connections c3-c6 and c14. The VoIP SIP server informs VoIP location server 100 through connection c15 of a call request originated by WD_y1 and destined for WD_x1. The VoIP location server 100 will reply with the latest VoIP location address available in its database of WD_x1 through connections c2 and c1-c5 and send data with instructions for WD_x1 VoIP location software module 'sm' to switch from GPRS to 3G (highest available VoIP bandwidth) and activate the corresponding SIP application to allow it to receive the incoming call ringing signalling, or alternatively to notify the user of WD_x1 with a notification of an incoming call such that the user can accept or reject it. In the event of acceptance of the incoming notification the corresponding action will be automatically performed by the 'sm', for example activate the corresponding SIP application as to accept the incoming call request originated by WD_y1.

Figure 3:
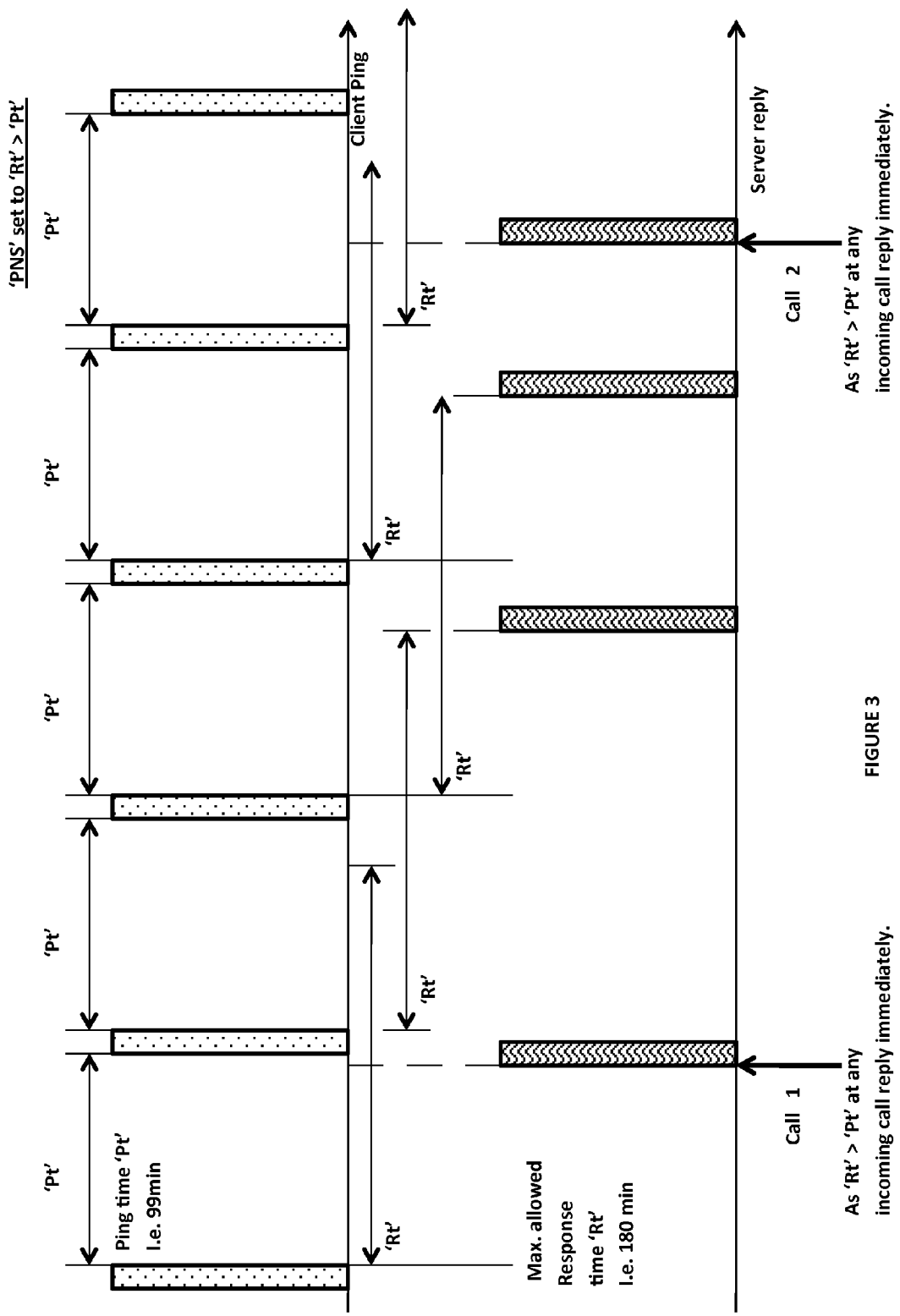
FIG. 3 is a timing chart of the preferred embodiment of the present invention.
Figure 4:
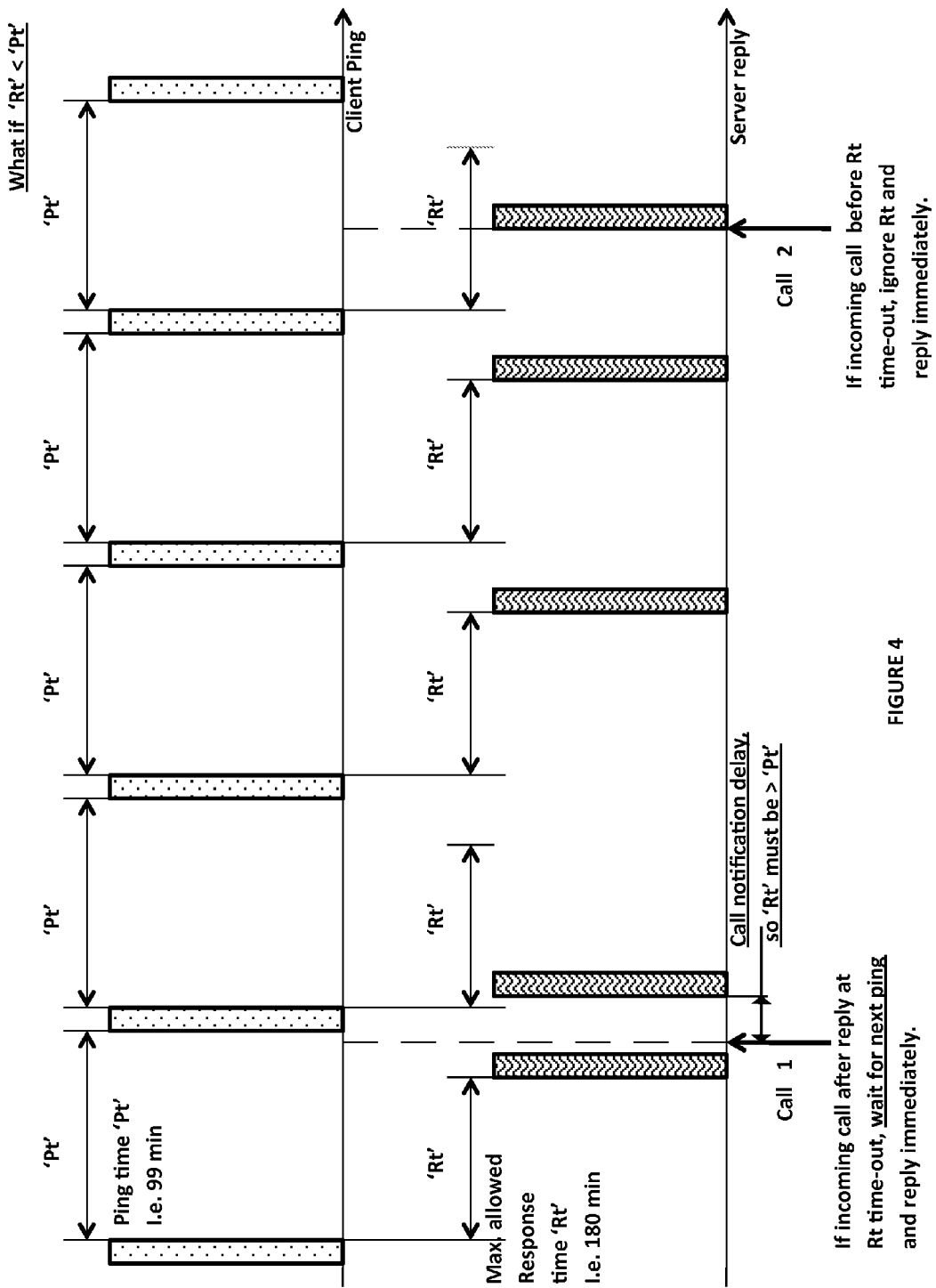
FIG. 4 is a timing chart enforcing previous FIG. 3 preferred embodiment of the present invention

Referring to FIGS. 3 and 4, these show the timing of communications between the two main parts of the Dynamic VoIP location system, namely between VoIP location software module 'sm', referred to in FIGS. 3 and 4 as "Client Ping" and VoIP Location server '100', referred to in FIGS. 3 and 4 as "Server Reply". It illustrates the same previous example of a SIP call originated by WD_y1, referred to in FIGS. 3 and 4 as 'Call 1' and a subsequent later call also originated by WD_y1 referred to as 'Call 2'. Both 'Call 1' and 'Call 2' are destined for WD_x1, as explained herein. The time 'Pt' refers to the time between two consecutive communications (VoIP location updates) between WD_x1 and server 100 and the corresponding VoIP location update in the database 100 or 101 corresponding to WD_x1. The timing 'Re is the time the software module ms' allows the server 100 to send a reply that WD_x1 would deem acceptable as valid. This time 'Rt' is defined by the wireless device's 'sm' as 'Rt' being bigger then 'Pt' when communicating with server 100. It is important to note, that the time 'Pt' may vary between consecutive 'Pt's' and the 'sm' also dynamically adapts the allowed 'Rt' by server 100 in compliance with previous condition of 'Rt'>'Pt'. It is also important to note that the server 100 does not necessarily reply to 'sm' communications for VoIP Location updates, but simply extracts and stores the VoIP Location address in the corresponding database user data and only replies to the corresponding wireless device's 'sm' exactly at the time when the server 100 has data for a specific subscribed user's 'sm' (be it a notification of some sort or a message or an incoming call and so forth). This last is in fact possible to be instant—i.e. at the time the server 100 has data to be sent to a specific device's 'sm' because of the condition of 'Rt' (allowed response time of server 100)>'Pt' (time between two consecutive VoIP location updates by a device's software module 'sm').

This automated dynamic way of obtaining the "VoIP Location" between an incoming VoIP location update request and any available VoIP location address available in the database 100 or 101 is generally very fast because VoIP (voice over internet protocol) access and database access is generally fast. Furthermore, as reducing power consumption to a minimum whilst maintaining high reliability of updating the VoIP location corresponding to each user subscribed to the Dynamic VoIP Location system, it is crucial that it is understood that the software modules 'sm' together with the VoIP Location server "100' which includes a VoIP Location database inside '100' or separate as '101' together form the Dynamic VoIP Location system.

Any of the various components or sub-steps disclosed above can be used either alone, or in multiple parallel set-ups, or with other components, or with components or features of the present invention.

It will be apparent to those skilled in the art that various modifications and variations can be made to the "Dynamic VoIP Location system", "VoIP Location server" or "VoIP Location software module" of the present invention without departing from the spirit or scope of the invention.

The foregoing disclosure of embodiments of the present invention has been presented for purposes of illustration and description. It is not exhaustive or intended to limit the invention to the precise forms disclosed herein. Many variations and modifications of the embodiments described herein will be obvious to one of ordinary skill in the art in light of the above disclosure. The scope of the invention is to be defined only by the claims appended hereto, and by their equivalents.

The invention claimed is:

1. A system for detecting or determining any given "VoIP (Voice over internet protocol) location" of any "VoIP enabled wireless device registered to the system" by extracting any such device's "VoIP address or return path" and storing it and updating it in one or more accessible databases, the system including a server, a VoIP enabled wireless device registered to the server and a software module downloadable from the server to the VoIP enabled wireless device, in which: (a) the system is adapted to receive VOID communications from multiple VoIP enabled wireless devices; (b) the system enables access to information in one or more databases; (c) the system is capable of extracting and reporting dynamically the "VoIP address or return path" and all associated information from each incoming data communication from any "VoIP enabled wireless device registered to the system" into a database(s) associated with each corresponding registered VoIP enabled wireless device user account; (d) the system is capable of extracting a specific "VoIP address or return path" and all associated information corresponding to a specific registered VOID enabled wireless device user account from the system accessible database(s) and communicating with each specific VoIP enabled wireless device registered to the system through each specific "VoIP address or return path"; (e) in which the VoIP enabled wireless device registered to the server incorporates the software module, which at certain time intervals authenticates and connects to the server which is part of the system, and (f) wherein a time between each time interval of the registered VoIP enabled wireless device authenticating and connecting with the server is less than a time allowed by the registered VoIP enabled wireless device to receive a response from the server.

2. The system of claim 1 where the server then authenticates if it's a registered VoIP wireless device user and extracts the "VoIP address or return path" and stores this data into the registered VoIP enabled wireless device user account as the "VoIP location" and the server can at any time send data to any specific registered VoIP wireless device user.

3. The system of claim 1 where such time intervals correspond to the times of detection of any change of VoIP access method or access name by the "VoIP enabled wireless device registered to the system".

4. The system of claim 3 where the transition from the "VoIP enabled wireless device registered to the system" changes from not synchronised to synchronised is also classified as a change of VoIP access method or access name.

5. The system of claim 1, wherein any "VoIP enabled wireless device registered to the system" (VoIP device 1) can connect to any such other different "VoIP enabled wireless device registered to the system" (VoIP device 2), the system comprising: (a) "VoIP device 1" authenticating and connecting to the system server and providing in its payload data destined for "VoIP device 2"; (b) the server extracting from the data communication with "VoIP device 1" the payload data destined for "VoIP device 2"; (c) the server extracting from its accessible database the "VoIP location" or "VoIP address or return path" of "VoIP device 2" and communicating with "VoIP device 2" by sending it the data and the origin of such data as having been originated from "VoIP device 1".

6. The system of claim 1, wherein any "VoIP enabled wireless device registered to the system" (VoIP device 3) can send commands to any such other different "VoIP enabled wireless device registered to the system" (VoIP device 4) the system comprising: (a) "VoIP device 3" authenticating and connecting to the system server and providing in its payload a command known by and destined for "VoIP device 4"; (b) the server extracting from the data communication with "VoIP device 3" the payload command data destined for "VoIP device 4"; (c) the server extracting from its accessible database the "VoIP location" or "VoIP address or return path" of "VoIP device 4" and communicate with "VoIP device 4" by sending it the command data; (d) optionally the server sending to its destination "VoIP device 4" together with the command data also the origin of such data as having been originated from "VoIP device 3".

7. The system of claim 1, wherein the system server can send payload data or payload commands to any individual or such multiple "VoIP enabled wireless device(s) registered to the system" the system comprising: (a) the system server extracting from its accessible database(s) the "VoIP location" or "VoIP address or return path" of any individual or such multiple "VoIP enabled wireless device(s) registered to the system" it wishes to communicate with; (b) the server extracting from its accessible database(s) any such payload data and/or payload commands; the server send the payload data or payload commands from item (b) to all the "VoIP address or return paths" of item (a) corresponding to each unique "VoIP enabled wireless device(s) registered to the system".

8. The system according to claim 1, wherein the system server stores a "software module" which can be downloaded by any "VoIP enabled wireless device".

9. The system according to claim 1, wherein the "VoIP enabled wireless device" registered to the system is a mobile phone, a mobile smart phone, a wireless pc card, a wireless module, a wireless tablet, or a wireless pc.

10. The system according to claim 1, wherein a "VoIP enabled wireless device" can download over the air the "software module".

11. The system of claim 10 wherein such software module is also capable of; (a) detecting if any other software applications other than the said "software module" is active and (b) if the "VoIP enabled wireless device" is in the standby mode, then (c) if items (a) and (b) are not detected then the "software module" will disable the highest bandwidth VoIP communication and enable only the lowest bandwidth VoIP communication method available to the "VoIP enabled wireless device", and (d) if the "software module" detects any of items (a) or (b) then it will deactivate item (c), meaning it will activate or enable the highest bandwidth VoIP communication available to the "VoIP enabled wireless device".

12. The system according to claim 1, wherein a "VoIP enabled wireless device" registered to the system server in particular includes such "certain time intervals" being performed at the times of detection of any change of mobile network cell, wherein the transition from the "VoIP enabled wireless device registered to the system" changing from not synchronised to synchronised to a mobile network cell is also considered a change of VoIP access method or name.

13. The system according to claim 1, wherein a "VoIP enabled wireless device" registered to the system is a wired line VoIP enabled device.

14. The system according to claim 1, wherein "VoIP" uses any data communications protocol selected from the following: GSM/GPRS, WAP, 3G, UMTS, 4G, WiFi, Wimax, CDMA, WCDMA, WSCDMA, SCDMA, TDSCDMA, CWTS, CWPAN, PDS, PHS, Bluetooth, WRP, WNP, WAN, LAN, ATM, ISDN, DSL, ADSL, VDSL, ISDM, HTML, TCP/IP, HTTP, HTTPS, UDP.

15. A method for detecting or determining any given "VoIP (Voice over internet protocol) location" of any "VoIP enabled wireless device registered to the system" by extracting any such wireless device's "VoIP address or return path" and storing it and updating it in one or more accessible databases, in which the method is performed by a system, the system including a server, a VoIP enabled wireless device registered to the server and a software module downloadable from the server to the VoIP enabled wireless device, in which: (a) the system receives VoIP communications from multiple VoIP enabled wireless devices; (b) the system enables access to information in one or more databases; (c) the system is extracts and reports dynamically the "VoIP address or return path" and all associated information from each incoming data communication from any "VoIP enabled wireless device registered to the system" into a database(s) associated with each corresponding registered VoIP enabled wireless device user account (d) the system extracts a specific "VoIP address or return path" and all associated information corresponding to a specific registered VoIP enabled wireless device user account from the system accessible database(s) and communicates with each specific VoIP enabled wireless device registered to the system through each specific "VoIP address or return path"; (e) in which the VOID enabled wireless device registered to the server incorporates the software module, which at certain time intervals authenticates and connects to the server which is part of the system, and (f) wherein a time between each time interval of the registered VoIP enabled wireless device authenticating and connecting with the server is less than a time allowed by the registered VoIP enabled wireless device to receive a response from the server.

16. A system for detecting or determining any given "VoIP (Voice over internet protocol) location" of any "VoIP enabled wireless device registered to the system" by extracting any such device's "VoIP address or return path" and storing it and updating it in one or more accessible databases, the system including a server, a VoIP enabled wireless device registered to the server and a software module downloadable from the server to the VoIP enabled wireless device, in which: (a) the system is adapted to receive VOID communications from multiple VoIP enabled wireless devices; (b) the system enables access to information in one or more databases; (c) the system is capable of extracting and reporting dynamically the "VoIP address or return path" and all associated information from each incoming data communication from any "VoIP enabled wireless device registered to the system" into a database(s) associated with each corresponding registered VoIP enabled wireless device user account; (d) the system is capable of extracting a specific "VoIP address or return path" and all associated information corresponding to a specific registered VoIP enabled wireless device user account from the system accessible database(s) and communicating with each specific VoIP enabled wireless device registered to the system through each specific "VoIP address or return path"; (e) in which the VoIP enabled wireless device registered to the server incorporates the software module, which at certain time intervals authenticates and connects to the server which is part of the system, and (f) wherein such time intervals correspond to the times of detection of any change of VoIP access method or access name by the "VoIP enabled wireless device registered to the system", and wherein a transition in which the "VoIP enabled wireless device registered to the system" changes from not connected to connected is also classified as a change of VoIP access method or access name.

17. A method for detecting or determining any given "VoIP (Voice over internet protocol) location" of any "VoIP enabled wireless device registered to the system" by extracting any such wireless device's "VoIP address or return path" and storing it and updating it in one or more accessible databases, in which the method is performed by a system, the system including a server, a VoIP enabled wireless device registered to the server and a software module downloadable from the server to the VoIP enabled wireless device, in which: (a) the system receives VoIP communications from multiple VoIP enabled wireless devices; (b) the system enables access to information in one or more databases; (c) the system is extracts and reports dynamically the "VoIP address or return path" and all associated information from each incoming data communication from any "VoIP enabled wireless device registered to the system" into a database(s) associated with each corresponding registered VoIP enabled wireless device user account; (d) the system extracts a specific "VoIP address or return path" and all associated information corresponding to a specific registered VoIP enabled wireless device user account from the system accessible database(s) and communicates with each specific VoIP enabled wireless device registered to the system through each specific "VoIP address or return path"; (e) in which the VoIP enabled wireless device registered to the server incorporates the software module, which at certain time intervals authenticates and connects to the server which is part of the system, and (f) wherein such time intervals correspond to the times of detection of any change of VoIP access method or access name by the "VoIP enabled wireless device registered to the system", and wherein a transition in which the "VoIP enabled wireless device registered to the system" changes from not connected to connected is also classified as a change of VoIP access method or access name.

18. A system for detecting or determining any given "VoIP (Voice over internet protocol) location" of any "VoIP enabled wireless device registered to the system" by extracting any such device's "VoIP address or return path" and storing it and updating it in one or more accessible databases, the system including a server, a VoIP enabled wireless device registered to the server and a software module downloadable from the server to the VoIP enabled wireless device, in which: (a) the system is adapted to receive VoIP communications from multiple VoIP enabled wireless devices; (b) the system enables access to information in one or more databases; (c) the system is capable of extracting and reporting dynamically the "VoIP address or return path" and all associated information from each incoming data communication from any "VoIP enabled wireless device registered to the system" into a database(s) associated with each corresponding registered VoIP enabled wireless device user account; (d) the system is capable of extracting a specific "VoIP address or return path" and all associated information corresponding to a specific registered VoIP enabled wireless device user account from the system accessible database(s) and communicating with each specific VoIP enabled wireless device registered to the system through each specific "VoIP address or return path"; (e) in which the VoIP enabled wireless device registered to the server incorporates the software module, which at certain time intervals authenticates and connects to the server which is part of the system, and (f) wherein
  a "VoIP enabled wireless device" can download over the air the "software module",
  and wherein such software module is also capable of (i) detecting if any other software applications other than the said "software module" is active and (ii) if the "VoIP enabled wireless device" is in the standby mode, then (iii) if items (i) and (ii) are not detected then the "software module" will disable the highest bandwidth VoIP communication and enable only the lowest bandwidth VoIP communication method available to the "VoIP enabled wireless device", and (iv) if the "software module" detects any of items (i) or (ii) then it will deactivate item (iii), meaning it will activate or enable the highest bandwidth VoIP communication available to the "VoIP enabled wireless device".

19. A method for detecting or determining any given "VoIP (Voice over internet protocol) location" of any "VoIP enabled wireless device registered to the system" by extracting any such wireless device's "VoIP address or return path" and storing it and updating it in one or more accessible databases, in which the method is performed by a system, the system including a server, a VoIP enabled wireless device registered to the server and a software module downloadable from the server to the VoIP enabled wireless device, in which: (a) the system receives VoIP communications from multiple VoIP enabled wireless devices; (b) the system enables access to information in one or more databases; (c) the system is extracts and reports dynamically the "VoIP address or return path" and all associated information from each incoming data communication from any "VoIP enabled wireless device registered to the system" into a database(s) associated with each corresponding registered VoIP enabled wireless device user account; (d) the system extracts a specific "VoIP address or return path" and all associated information corresponding to a specific registered VoIP enabled wireless device user account from the system accessible database(s) and communicates with each specific VoIP enabled wireless device registered to the system through each specific "VoIP address or return path"; (e) in which the VoIP enabled wireless device registered to the server incorporates the software module, which at certain time intervals authenticates and connects to the server which is part of the system, and (f) wherein a "VoIP enabled wireless device" downloads over the air the "software module", and wherein such software module (i) detects if any other software applications other than the said "software module" is active and (ii) if the "VoIP enabled wireless device" is in the standby mode, then (iii) if items (i) and (ii) are not detected then the "software module" disables the highest bandwidth VoIP communication and enables only the lowest bandwidth VoIP communication method available to the "VoIP enabled wireless device", and (iv) if the "software module" detects any of items (i) or (ii) then it deactivates item (iii), meaning it activates or enables the highest bandwidth VoIP communication available to the "VoIP enabled wireless device".

\* \* \* \* \*

UNITED STATES PATENT AND TRADEMARK OFFICE
CERTIFICATE OF CORRECTION

PATENT NO.        : 9,369,575 B2
APPLICATION NO.   : 14/110015
DATED             : June 14, 2016
INVENTOR(S)       : Jose Luis Merino Gonzalez and Jonathan Myers It is certified that error appears in the above-identified patent and that said Letters Patent is hereby corrected as shown below:

Claims

Claim 1, column 8, lines 55 and 66, each occurrence, change "VOID" to --VoIP--;

Claim 15, column 10, line 64, change "VOID" to --VoIP--;

Claim 16, column 11, line 14, change "VOID" to --VoIP--.

Signed and Sealed this
Twenty-third Day of August, 2016

Michelle K. Lee
*Director of the United States Patent and Trademark Office*